(12) United States Patent
Hossain (10) Patent No.: US 11,524,780 B2
(45) Date of Patent: Dec. 13, 2022

(54) FAN POWERED FOLDING WING BICYCLE APPARATUS

(71) Applicant: Faruk Hossain, Jamaica, NY (US)

(72) Inventor: Faruk Hossain, Jamaica, NY (US)

(\*) Notice: Subject to any disclaimer, the term of this patent is extended or adjusted under 35 U.S.C. 154(b) by 78 days.

(21) Appl. No.: 17/143,315

(22) Filed: Jan. 7, 2021

(65) Prior Publication Data

US 2022/0212786 A1 Jul. 7, 2022

(51) Int. Cl.
| | | |
|---|---|---|
| *B64C 37/00* | (2006.01) | |
| *B64D 27/14* | (2006.01) | |
| *B62K 3/04* | (2006.01) | |
| *B60F 5/02* | (2006.01) | |
| *B64C 3/54* | (2006.01) | |
| *B64C 11/00* | (2006.01) | |

(52) U.S. Cl.
CPC ............... *B64C 37/00* (2013.01); *B60F 5/02* (2013.01); *B62K 3/04* (2013.01); *B64C 3/546* (2013.01); *B64D 27/14* (2013.01); *B64C 11/001* (2013.01)

(58) Field of Classification Search
CPC ......... B64C 37/00; B64C 37/546; B64C 3/38; B64C 3/54; B64C 3/546; B64C 3/56; B64C 27/02; B64C 27/024; B64C 27/022; B64C 1/06; B64C 1/061; B64C 1/063; B64C 1/30; B60F 5/02; B62K 13/00; B62K 19/00; B62K 19/06; B62D 57/04
USPC .................................................. 180/7.3, 7.4
See application file for complete search history.

(56) References Cited

U.S. PATENT DOCUMENTS

| | | | | |
|---|---|---|---|---|
| 1,322,903 | A | * | 11/1919 | Hyland ................... B62D 57/04 |
| | | | | 180/7.4 |
| 3,710,883 | A | * | 1/1973 | Rizzo ................... B62K 15/006 |
| | | | | 280/278 |
| 4,068,810 | A | | 1/1978 | Malewicki |
| 5,078,335 | A | | 1/1992 | David |
| 6,619,584 | B1 | | 9/2003 | Haynes |
| 7,815,144 | B2 | | 10/2010 | Molnar |
| 8,267,347 | B2 | | 9/2012 | Goldshteyn |
| 8,371,520 | B2 | | 2/2013 | Easter |
| D808,861 | S | | 1/2018 | Zhon |
| 10,532,813 | B2 | | 1/2020 | Bialek |
| 2002/0166709 | A1 | * | 11/2002 | Michisaka ............... B62J 11/13 |
| | | | | 180/219 |
| 2015/0226086 | A1 | * | 8/2015 | Samuelson ............ B64D 29/04 |
| | | | | 415/121.3 |

(Continued)

FOREIGN PATENT DOCUMENTS

| | | | | |
|---|---|---|---|---|
| CA | 2014391 | A1 * | 10/1990 | ................ B60F 5/02 |
| CN | 107757273 | A * | 3/2018 | ................ B60F 5/02 |

(Continued)

*Primary Examiner* — Joshua J Michener
*Assistant Examiner* — Ryan Andrew Yankey (57) ABSTRACT

A fan powered folding wing bicycle apparatus for novelty and transportation includes a frame and a rear wheel coupled between a pair of lower horizontal tubes. A stem is pivotably coupled within a head tube. A handle bar is coupled to the stem. A pair of forks is coupled to the stem and a front wheel is coupled to the pair of forks. A pair of engine straps is coupled between a pair of top horizontal tubes. A duct is coupled to the pair of engine straps and a turbine is coupled within the duct. A seat is coupled to the duct. A battery is in operational communication with the turbine. A pair of wings is pivotably coupled to the pair of top horizontal tubes.

7 Claims, 6 Drawing Sheets

(56) References Cited

U.S. PATENT DOCUMENTS

2015/0329176 A1* 11/2015 Inoue .................. H01M 50/271
　　　　　　　　　　　　　　　　　　　　180/220
2019/0300170 A1　　10/2019　Bousfield

FOREIGN PATENT DOCUMENTS

| CN | 109435605 A | * | 3/2019 | ................ B60F 5/02 |
| DE | 2438526 A1 | * | 2/1976 | ............. B64C 37/00 |
| WO | WO20070242267 | | 3/2007 | |

* cited by examiner

FAN POWERED FOLDING WING BICYCLE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to ridable toys and more particularly pertains to a new ridable toy for novelty and transportation. The present invention includes an electric ducted turbine engine as well as a pair of folding novelty wings.

(2) Description of Related Art Including Information Disclosed Under 37 CFR 1.97 and 1.98

The prior art relates to ridable toys. Known devices focus on functional flying mechanisms and thus require significant wings and thrust generation. These devices lack a seat mounted on top of a ducted turbine engine. Known devices also lack wings with an upright folded position and a pair of support wheels for the wings while extended.

BRIEF SUMMARY OF THE INVENTION

An embodiment of the disclosure meets the needs presented above by generally comprising a frame having a pair of lower horizontal tubes, a pair of top horizontal tubes, and a plurality of frame support bars extending therebetween. The frame has a pair of down tubes extending up from the pair of lower horizontal tubes and a head tube coupled to the pair of down tubes. A rear wheel is coupled to the frame between the pair of lower horizontal tubes. A stem is coupled to the frame. The stem is pivotably coupled within the head tube. A handle bar is coupled to the stem. A pair of forks is coupled to the stem and a front wheel is coupled to the pair of forks. A pair of engine straps is coupled to the frame. The pair of engine straps is coupled between the pair of top horizontal tubes. A duct is coupled to the pair of engine straps. The duct has a duct front end and a duct rear end. A turbine is coupled within the duct. The turbine pulls air through the duct front end and out the duct rear end. A seat is coupled to the duct. A battery is coupled to the frame. The battery is coupled to the pair of lower horizontal tubes and is in operational communication with the turbine. A pair of wings is coupled to the frame. The pair of wings is pivotably coupled to the pair of top horizontal tubes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new ridable toy embodying the principles and concepts of an embodiment of the disclosure and generally designated by the reference numeral 10 will be described.

As best illustrated in FIGS. 1 through 6, the fan powered folding wing bicycle apparatus 10 generally comprises a frame 12. The frame 12 has a pair of lower horizontal tubes 14, a pair of top horizontal tubes 16, and a plurality of frame support bars 18 extending therebetween. The pair of lower horizontal tubes 14 and the pair of top horizontal tubes 16 may all be parallel. The frame 12 has a pair of down tubes 20 extending up from the pair of lower horizontal tubes 14 and a head tube 22 coupled to the pair of down tubes 20. The pair of down tubes 20 are angled in to join at the head tube 22. The plurality of frame support bars 18 may form a pair of front triangles 24 and a pair of rear triangles 26 for maximum structural integrity. There may be a reinforcement bar 27 extending between the pair of down tubes 20 and the head tube 22 for further reinforcement.

A pair of foot pegs 28 is coupled to the frame 12. The pair of foot pegs 28 is coupled to the pair of lower horizontal tubes 14 and may extend perpendicularly. Each foot peg 28 may have a flared end portion 30 to prevent a rider's foot from accidental sliding off the end. Each foot peg 28 may be rubberized for additional friction. A rear wheel 32 is coupled to the frame 12 between the pair of lower horizontal tubes 14. A stem 34 is pivotably coupled within the head tube 22. A handle bar 36 is coupled to the stem 34. The handle bar 36 may have a central drop portion 38 and a pair of handle grips 40. The handle bar 36 may also have a crossbar 42 extending through the central drop portion 38. A pair of forks 44 is coupled to the stem 34. The pair of forks 44 may be rigid or may alternatively have integrated shock absorbers. A front wheel 46 is coupled to the pair of forks 44.

A pair of engine straps 47 is coupled to the frame 12. The pair of engine straps 46 is coupled between the pair of top horizontal tubes 16. Each engine strap 47 may be U-shaped to conform to the profile of a duct 48 coupled to the pair of engine straps 47. The duct 48 has a duct front end 50 and a duct rear end 52. The duct 48 may include a main cowl portion 54 having a cowl front end 56 and a cowl rear end 58. The duct 48 may also include an exhaust tail portion 60 extending from the cowl rear end 58. The main cowl portion 54 and the exhaust tail portion 60 conform to the shape of a jet engine. The cowl rear end 58 may be angled 25°-30° from vertical.

A turbine 62 is coupled within the duct 48. The turbine 62 pulls air through the duct front end 50 and out the duct rear end 52 to propel the apparatus 10. The turbine 62 may include a plurality of motor struts 64 coupled to the duct 48. A motor 66 is coupled to the plurality of motor struts 64 and a propeller blade 68 is coupled to the motor 66. The plurality of motor struts 64 may be three motor struts 64 spaced 120° apart.

A seat 69 is coupled to the duct 48. The seat 69 is positioned on a duct top side 70 of the duct and spaced between the duct front end 50 and the duct rear end 52 for the user to comfortably rest his or her feet on the pair of foot pegs 28. A battery 72 is coupled to the frame 12. The battery 72 may include a battery housing 74 coupled to the pair of lower horizontal tubes 14 and a battery cell 76 coupled within the battery housing 74. The battery 72 is in operational communication with the turbine 62.

A pair of wings 78 is coupled to the frame 12. The pair of wings 78 is pivotably coupled to the pair of top horizontal tubes 16. Each wing 78 may include a proximal wing half 80 pivotably coupled to the respective top horizontal tube 16 and a distal wing half 82 pivotably coupled to the proximal wing half 80. Each distal wing half 82 may pivot between an extended position lying coplanar with the respective proximal wing half 80 and a folded position forming an angle between 130°-150° with the respective proximal wing half 80. A leading corner 84 of each distal wing half 82 may be rounded to prevent injury. The pair of wings 78 does not provide sufficient lift to elevate the apparatus 10 off the ground.

Figure 1:
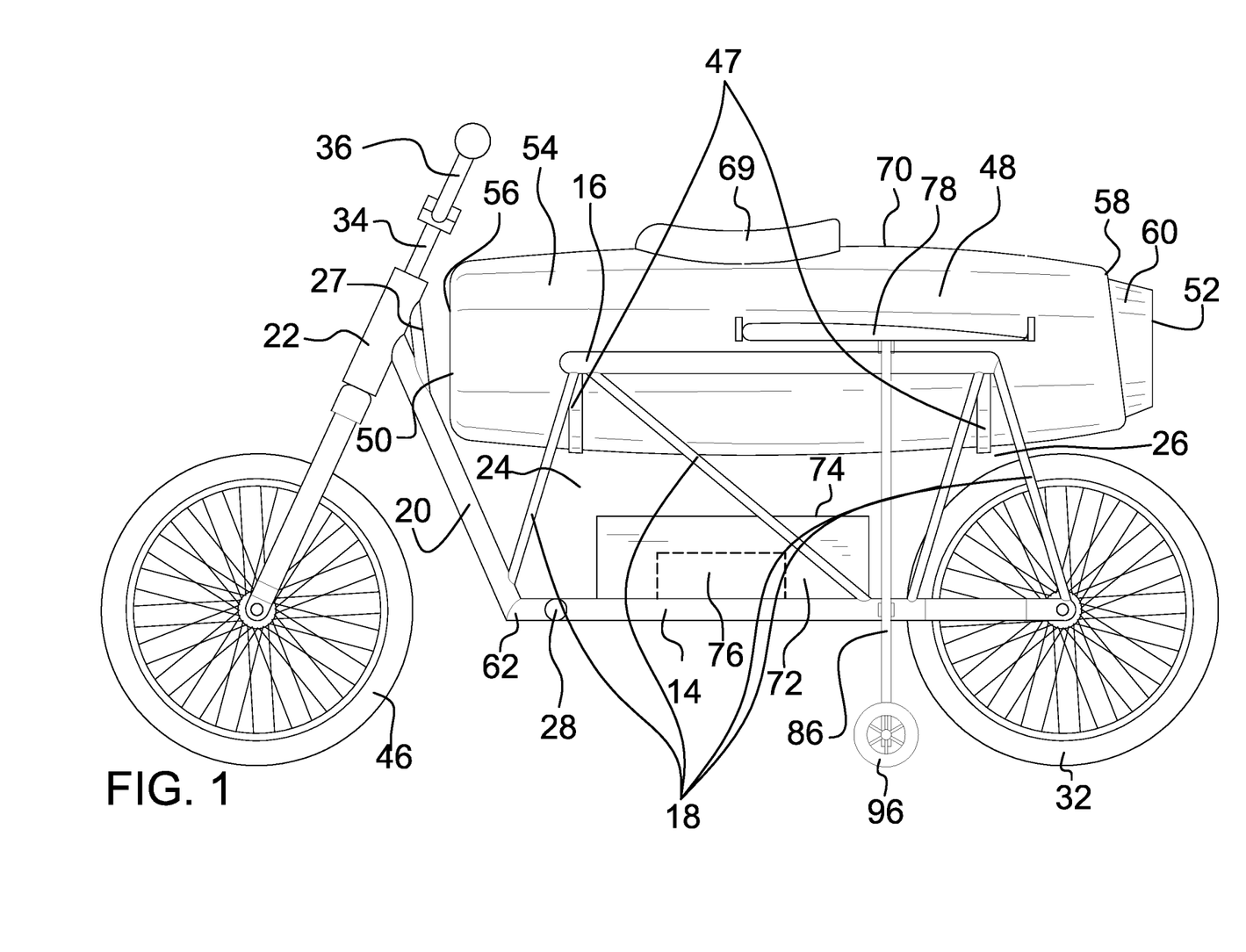
FIG. 1 is a side elevation view of a fan powered folding wing bicycle apparatus according to an embodiment of the disclosure.
Figure 2:
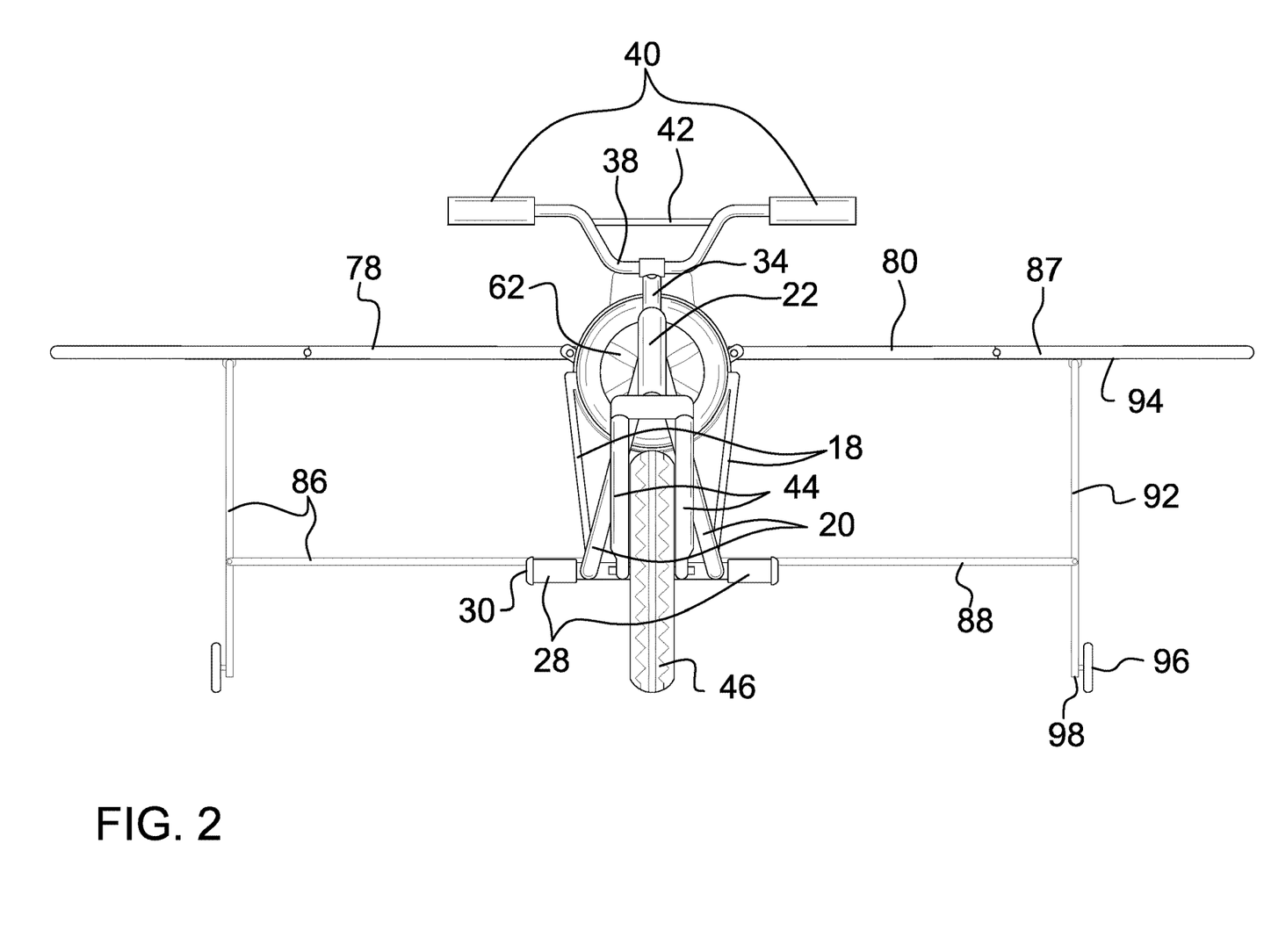
FIG. 2 is a front elevation view of an embodiment of the disclosure.
Figure 3:
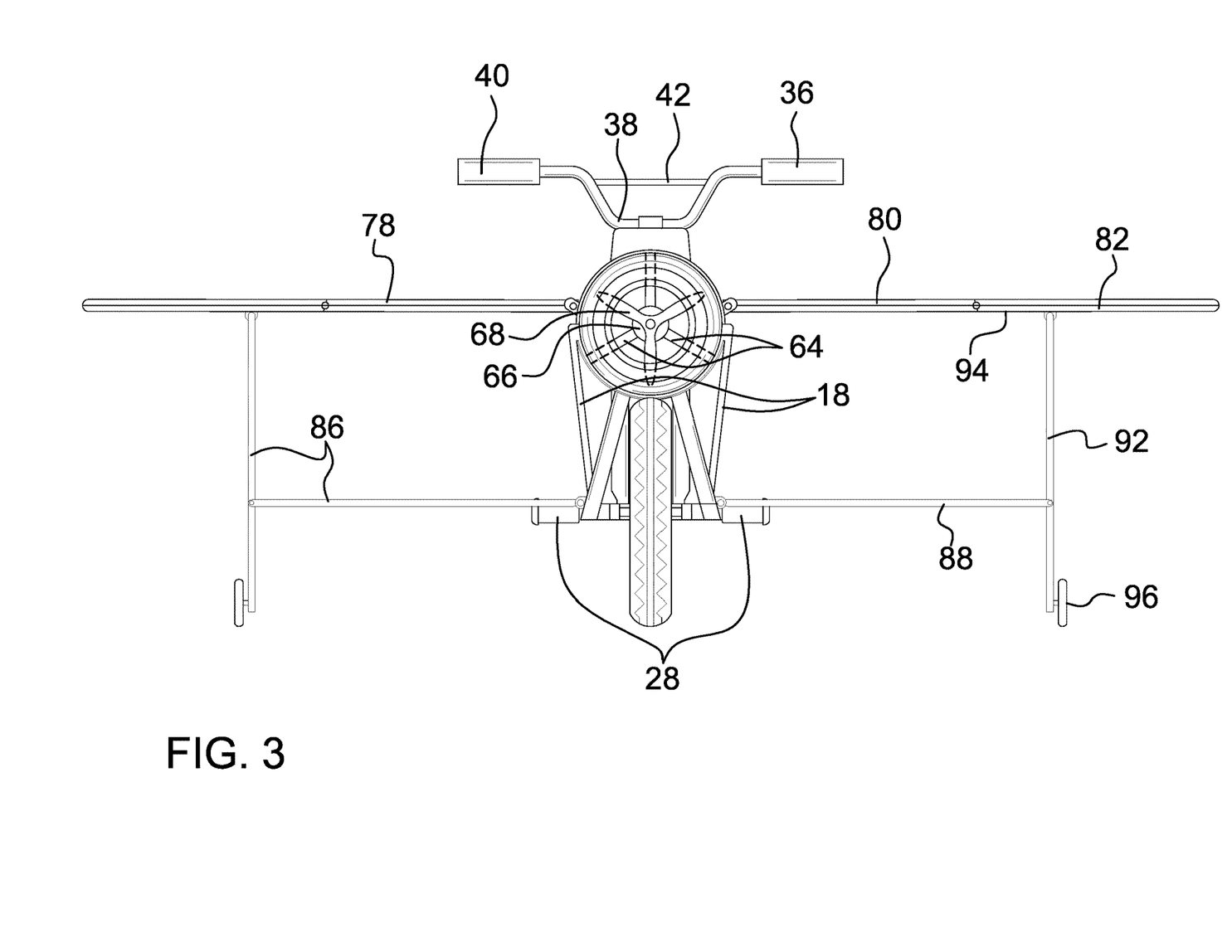
FIG. 3 is a rear elevation view of an embodiment of the disclosure.
Figure 4:
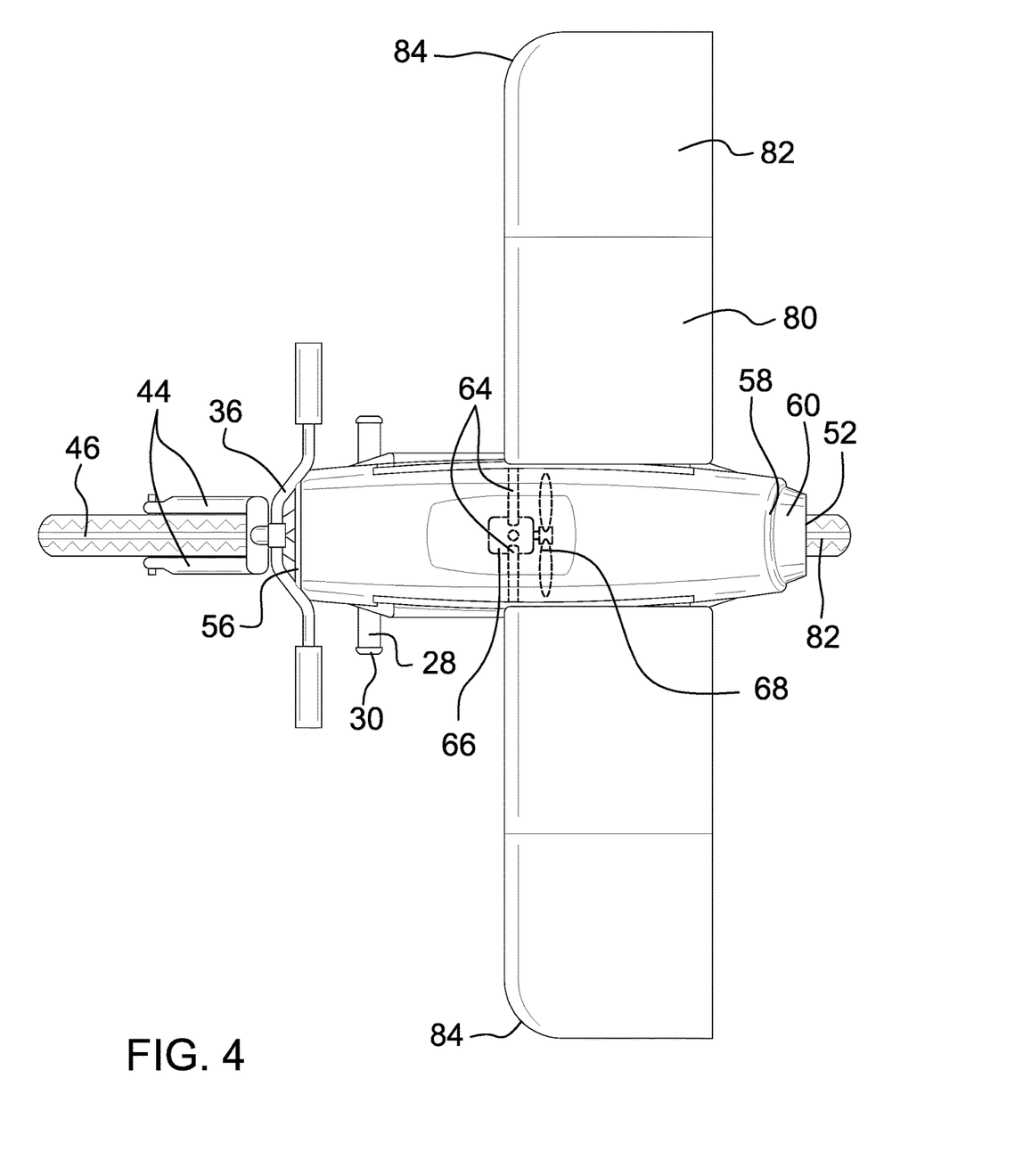
FIG. 4 is a top plan view of an embodiment of the disclosure.
Figure 5:
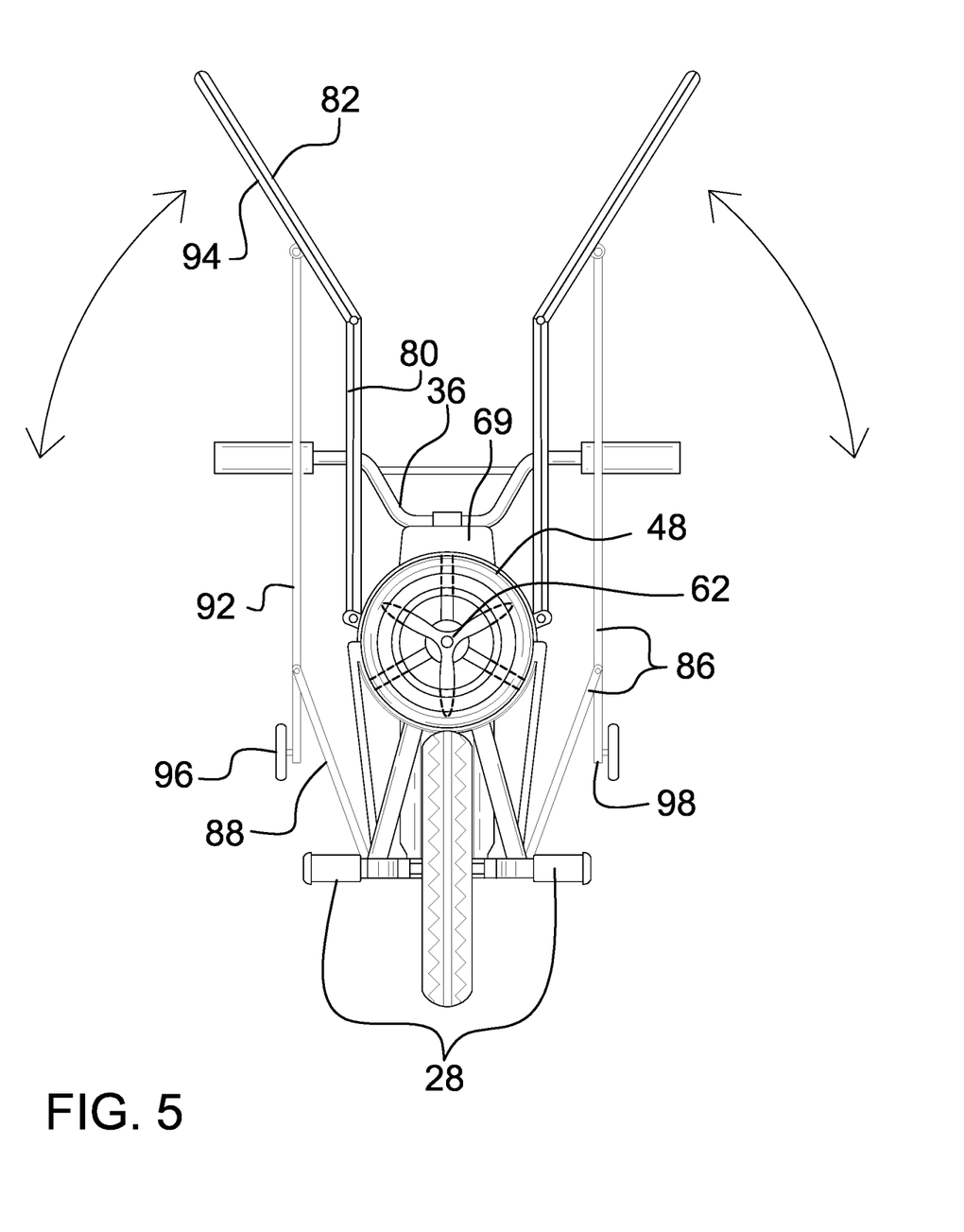
FIG. 5 is a rear elevation view of an embodiment of the disclosure.
Figure 6:
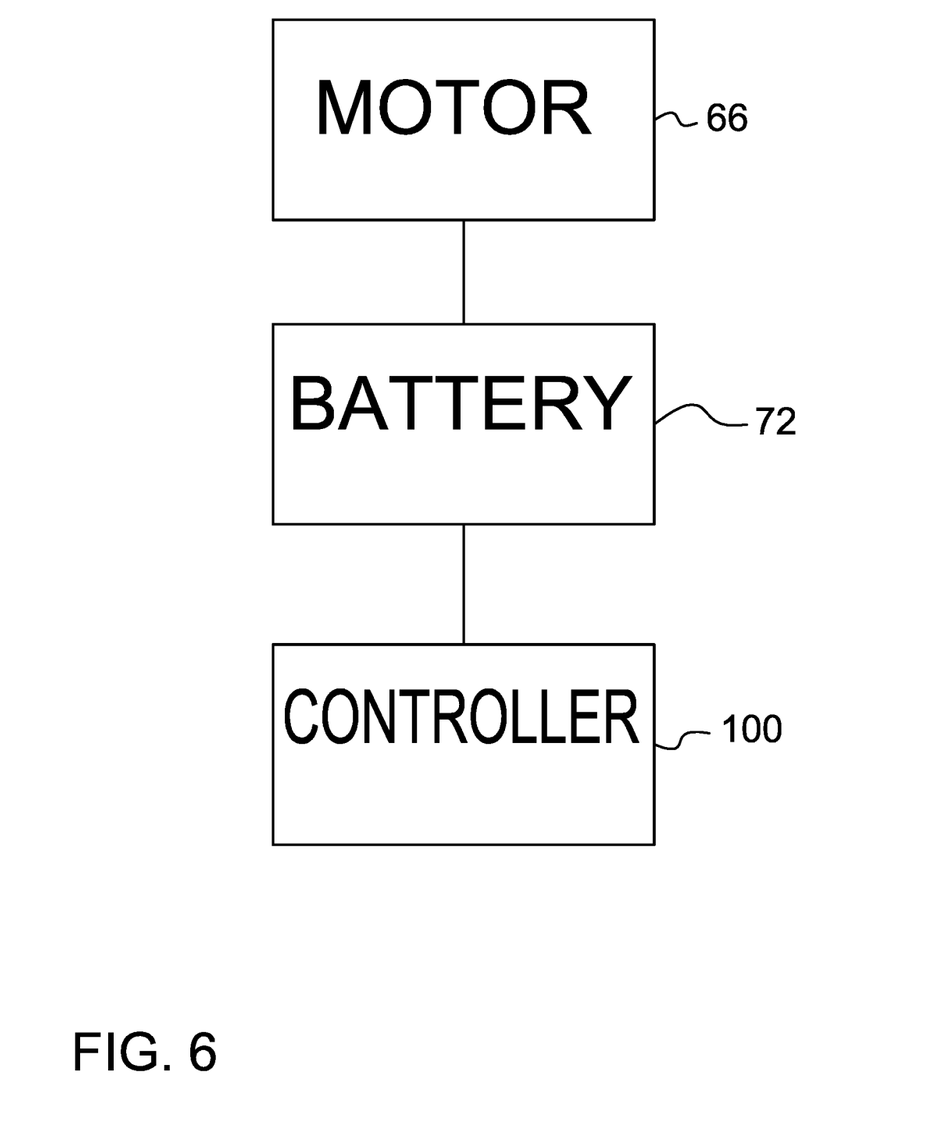
FIG. 6 is a block diagram of an embodiment of the disclosure.

A pair of linkages 86 is coupled to the pair of wings 78. Each linkage 86 includes a lower linkage bar 88 pivotably coupled to the pair of lower horizontal tubes 14 and a vertical linkage bar 92 coupled between the lower linkage bar 88 and an underside 94 of the wing. A pair of wing wheels 96 is coupled to the pair of linkages 86. Each wheel 96 is coupled to a bottom end 98 of the vertical linkage bar 92. The vertical linkage bar 92 is coupled to the respective distal wing half 82. With the pair of wings 78 in the extended position (as seen in FIGS. 2 and 3) the lower linkage bars 88 extend horizontally and the pair of wing wheels 96 contact the ground to support the pair of wings 78. With the pair of wings 78 in the folded position (as seen in FIG. 5) the lower linkage bars 88 remain parallel with the respective distal wing half 82.

In use, the rider sits on the seat 69 with his or her feet on the pair of foot pegs 28. A controller 100 that is in operational communication with the turbine 62 is used to control power to the motor 66. The apparatus 10 may be ridden with the pair of wings 78 in the extended position or the folded position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fan powered folding wing bicycle apparatus comprising:
   a frame, the frame having a pair of lower horizontal tubes, a pair of top horizontal tubes, and a plurality of frame support bars extending therebetween, the frame having a pair of down tubes extending up from the pair of lower horizontal tubes and a head tube coupled to the pair of down tubes;
   a rear wheel coupled to the frame, the rear wheel being coupled between the pair of lower horizontal tubes;
   a stem coupled to the frame, the stem being pivotably coupled within the head tube;
   a handle bar coupled to the stem;
   a fork with a pair of prongs coupled to the stem;
   a front wheel coupled to the pair of prongs;
   a pair of engine straps coupled to the frame, the pair of engine straps being coupled between the pair of top horizontal tubes;
   a duct coupled to the pair of engine straps, the duct having a duct front end and a duct rear end;
   a turbine coupled within the duct, the turbine pulling air through the duct front end and out the duct rear end;
   a seat coupled to the duct;
   a battery coupled to the frame, the battery being coupled to the pair of lower horizontal tubes, the battery being in operational communication with the turbine;
   a pair of wings coupled to the frame, the pair of wings being pivotably coupled to the pair of top horizontal tubes;
   a pair of linkages coupled to the pair of wings, each linkage including a lower linkage bar pivotably coupled to the pair of lower horizontal tubes and a vertical linkage bar coupled between the lower linkage bar and an underside of the wing; a pair of wing wheels being coupled to the pair of linkages, each wheel being coupled to the vertical linkage bar; and each wing including a proximal wing half pivotably coupled to the respective top horizontal tube and a distal wing half pivotably coupled to the proximal wing half; the vertical linkage bar being coupled to the respective distal wing half.

2. The fan powered folding wing bicycle apparatus of claim 1 further comprising a pair of foot pegs coupled to the frame, the pair of foot pegs being coupled to the pair of lower horizontal tubes.

3. The fan powered folding wing bicycle apparatus of claim 1 further comprising the turbine including a plurality of motor struts coupled to the duct, a motor coupled to the plurality of motor struts, and a propeller blade coupled to the motor.

4. The fan powered folding wing bicycle apparatus of claim 1 further comprising the duct including a main cowl portion having a cowl front end and a cowl rear end and an exhaust tail portion extending from the cowl rear end.

5. The fan powered folding wing bicycle apparatus of claim 1 further comprising the plurality of frame support bars forming a pair of front triangles and a pair of rear triangles.

6. A fan powered folding wing bicycle apparatus comprising:

a frame, the frame having a pair of lower horizontal tubes, a pair of top horizontal tubes, and a plurality of frame support bars extending therebetween, the frame having a pair of down tubes extending up from the pair of lower horizontal tubes and a head tube coupled to the pair of down tubes;

a rear wheel coupled to the frame, the rear wheel being coupled between the pair of lower horizontal tubes;

a stem coupled to the frame, the stem being pivotably coupled within the head tube;

a handle bar coupled to the stem;

a fork with a pair of prongs coupled to the stem;

a front wheel coupled to the pair of prongs;

a pair of engine straps coupled to the frame, the pair of engine straps being coupled between the pair of top horizontal tubes;

a duct coupled to the pair of engine straps, the duct having a duct front end and a duct rear end, the duct including a main cowl portion having a cowl front end and a cowl rear end and an exhaust tail portion extending from the cowl rear end;

a turbine coupled within the duct, the turbine pulling air through the duct front end and out the duct rear end;

a seat coupled to the duct;

a battery coupled to the frame, the battery being coupled to the pair of lower horizontal tubes, the battery being in operational communication with the turbine:

a pair of wings coupled to the frame, the pair of wings being pivotably coupled to the pair of top horizontal tubes; and the cowl rear end being angled 25°-30° from vertical.

7. A fan powered folding wing bicycle apparatus comprising:

a frame, the frame having a pair of lower horizontal tubes, a pair of top horizontal tubes, and a plurality of frame support bars extending therebetween, the frame having a pair of down tubes extending up from the pair of lower horizontal tubes and a head tube coupled to the pair of down tubes, the plurality of frame support bars forming a pair of front triangles and a pair of rear triangles;

a pair of foot pegs coupled to the frame, the pair of foot pegs being coupled to the pair of lower horizontal tubes;

a rear wheel coupled to the frame, the rear wheel being coupled between the pair of lower horizontal tubes;

a stem coupled to the frame, the stem being pivotably coupled within the head tube;

a handle bar coupled to the stem;

a fork with a pair of prongs coupled to the stem;

a front wheel coupled to the pair of prongs;

a pair of engine straps coupled to the frame, the pair of engine straps being coupled between the pair of top horizontal tubes;

a duct coupled to the pair of engine straps, the duct having a duct front end and a duct rear end, the duct including a main cowl portion having a cowl front end and a cowl rear end and an exhaust tail portion extending from the cowl rear end, the cowl rear end being angled 25°-30° from vertical;

a turbine coupled within the duct, the turbine pulling air through the duct front end and out the duct rear end, the turbine including a plurality of motor struts coupled to the duct, a motor coupled to the plurality of motor struts, and a propeller blade coupled to the motor;

a seat coupled to the duct;

a battery coupled to the frame, the battery being coupled to the pair of lower horizontal tubes, the battery being in operational communication with the turbine;

a pair of wings coupled to the frame, the pair of wings being pivotably coupled to the pair of top horizontal tubes, each wing including a proximal wing half pivotably coupled to the respective top horizontal tube and a distal wing half pivotably coupled to the proximal wing half; and a pair of linkages coupled to the pair of wings, each linkage including a lower linkage bar pivotably coupled to the pair of lower horizontal tubes and a vertical linkage bar coupled between the lower linkage bar and an underside of the wing; a pair of wing wheels being coupled to the pair of linkages, each wheel being coupled to the vertical linkage bar, the vertical linkage bar being coupled to the respective distal wing half.

* * * * *